United States Patent
Van Den Berg et al.

(10) Patent No.: US 10,004,207 B2
(45) Date of Patent: Jun. 26, 2018

(54) LIVESTOCK FEED WAGON

(71) Applicant: LELY PATENT N.V., Maassluis (NL)

(72) Inventors: Karel Van Den Berg, Maassluis (NL); Jan Lambertus Pastoor, Maassluis (NL); Howard Sie, Maassluis (NL); Arie Huyzer, Maassluis (NL); Jan Martinus Van Kuilenburg, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 191 days.

(21) Appl. No.: 14/912,223

(22) PCT Filed: Jul. 31, 2014

(86) PCT No.: PCT/NL2014/050534
§ 371 (c)(1),
(2) Date: Feb. 16, 2016

(87) PCT Pub. No.: WO2015/037984
PCT Pub. Date: Mar. 19, 2015

(65) Prior Publication Data
US 2016/0198677 A1 Jul. 14, 2016

(30) Foreign Application Priority Data
Sep. 10, 2013 (NL) ...................................... 2011412

(51) Int. Cl.
*A01K 5/00* (2006.01)
*A01K 5/02* (2006.01)
(Continued)

(52) U.S. Cl.
CPC .......... *A01K 5/001* (2013.01); *A01F 25/2027* (2013.01); *A01K 5/004* (2013.01);
(Continued)

(58) Field of Classification Search
CPC ........ A01K 5/001; A01K 5/002; A01K 5/004; A01K 5/0258; A01F 25/2027;
(Continued)

(56) References Cited

U.S. PATENT DOCUMENTS 4,406,338 A * 9/1983 Dunbar .................. G01G 19/52
177/145
5,020,918 A * 6/1991 Faccia .................... A01K 5/004
241/260.1
(Continued)

FOREIGN PATENT DOCUMENTS

DE 20 2008 001 482 U1 4/2008
EP 0 880 890 A1 12/1998
(Continued)

*Primary Examiner* — Leslie A Nicholson, III
(74) *Attorney, Agent, or Firm* — Birch, Stewart, Kolasch & Birch, LLP

(57) ABSTRACT

A livestock feed wagon includes a frame, a feed container which is fitted on the frame, in particular provided with a feed mixer, a gripper construction having a movable arm construction and a gripper fitted thereon for grabbing an amount of animal feed from a pile of animal feed, and a weighing device. The weighing device is arranged and configured to weigh a grabbed amount of animal feed by determining a change in the weight of at least the feed container and the gripper construction with the grabbed amount of animal feed. As a result thereof, it is possible to determine both the total loaded weight in the feed container and the weight of a grabbed chunk of animal feed using the same weighing device, so that the chunk, if it is either too heavy or too light, can be returned prior being unloaded, if desired.

17 Claims, 2 Drawing Sheets

(51) Int. Cl.
*G01G 19/52* (2006.01)
*G06K 9/00* (2006.01)
*G06T 7/00* (2017.01)
*B25J 19/02* (2006.01)
*A01F 25/20* (2006.01)

(52) U.S. Cl.
CPC ............ *A01K 5/0258* (2013.01); *B25J 19/02* (2013.01); *G01G 19/52* (2013.01); *G06K 9/00201* (2013.01); *G06T 7/0004* (2013.01); *G06T 2207/10012* (2013.01); *G06T 2207/30128* (2013.01)

(58) Field of Classification Search
CPC .... G06K 9/00201; G01G 19/52; G06T 7/004; G06T 2207/10004; G06T 2207/30128; B25J 11/0045; B25J 15/0028; B25J 19/02
USPC .......................... 700/213, 250, 253, 258, 259
See application file for complete search history.

(56) References Cited

U.S. PATENT DOCUMENTS

| | | | |
|---|---|---|---|
| 7,118,268 B2* | 10/2006 | Van Der Plas | A01K 5/004 280/124.11 |
| 9,102,055 B1* | 8/2015 | Konolige | B25J 9/163 |
| 9,393,686 B1* | 7/2016 | Bradski | B25J 9/163 |
| 2010/0017035 A1* | 1/2010 | Van Den Berg | A01K 1/01 700/259 |
| 2010/0326363 A1 | 12/2010 | Van Den Berg | |
| 2016/0242361 A1* | 8/2016 | Liet | A01F 25/2027 |

FOREIGN PATENT DOCUMENTS

| | | |
|---|---|---|
| EP | 1 782 678 A2 | 5/2007 |
| FR | 2 874 477 A1 | 3/2006 |
| WO | WO 2007/120036 A1 | 10/2007 |

* cited by examiner

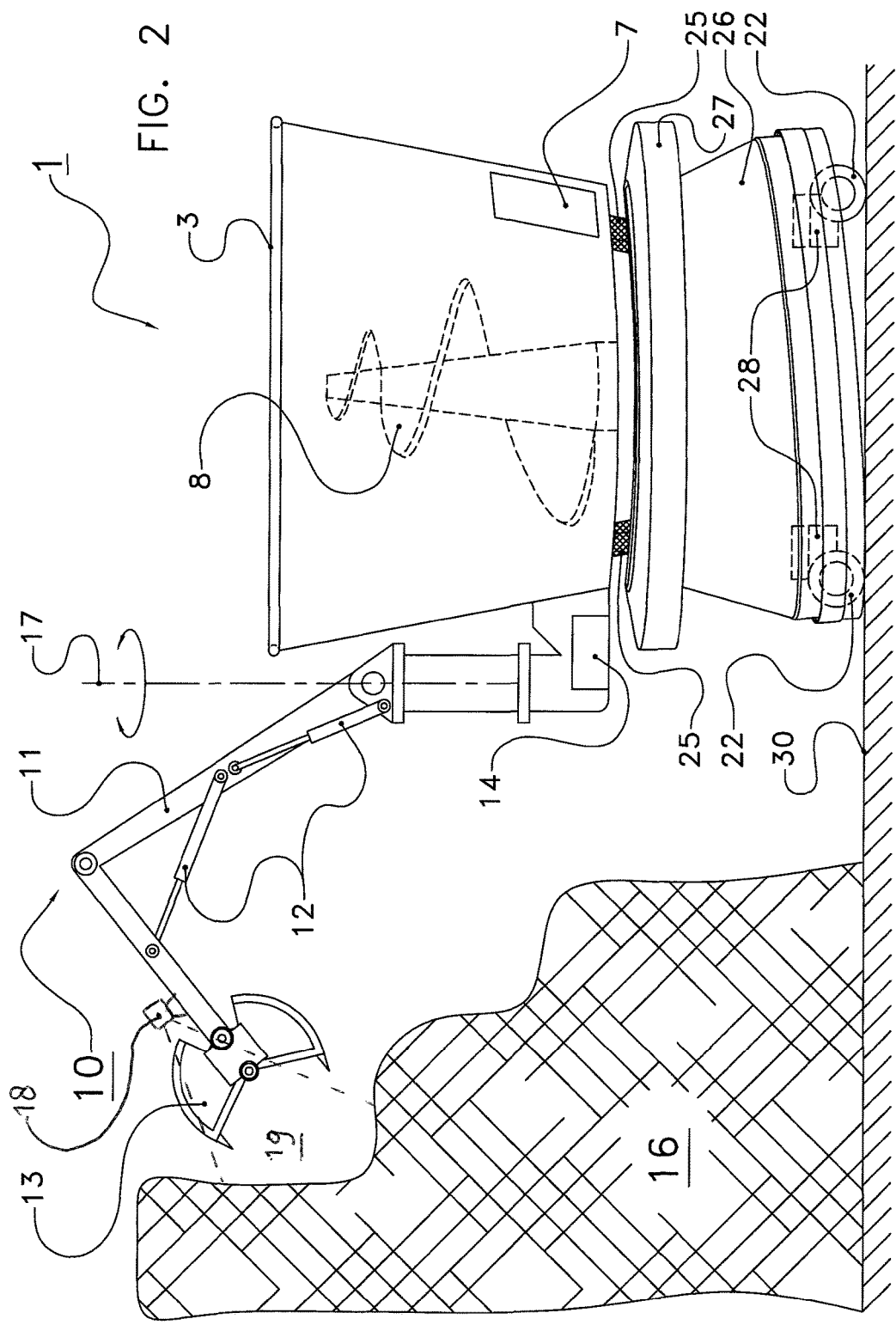

LIVESTOCK FEED WAGON

BACKGROUND OF THE INVENTION

The invention relates to a livestock feed wagon, comprising a frame, a feed container which is fitted on the frame, in particular provided with feed-mixing means, a gripper construction, having a movable arm construction and a gripper fitted thereon for grabbing an amount of animal feed from a pile of animal feed, furthermore comprising weighing means.

Such devices are known from the prior art, inter alia from FR2874477.

In such devices there are sometimes constraints with regard to the accuracy with which they can be loaded. Thus, the known device has weighing means which are situated underneath the feed container in order not to be affected by the weight of the feed-loading construction and the weight of the grabbed chunk of animal feed. In practice, it was found that this known device is often not able to load the desired total amount of animal feed, at least not very accurately.

SUMMARY OF THE INVENTION

It is an object of the present invention to improve devices of the known kind so that they can be used to load animal feed in a more accurate way.

The invention achieves this object by the livestock feed wagon according to Claim 1, in particular by a livestock feed wagon, comprising a frame, a feed container fitted on the frame, a gripper construction, having a movable arm construction and a gripper fitted thereon for grabbing an amount of animal feed from a pile of animal feed, furthermore comprising weighing means, wherein the weighing means are arranged and configured to weigh a grabbed amount of animal feed by determining a change in the weight of at least the feed container and the gripper construction with the grabbed amount of animal feed. The inventors have realised that although in itself it may be advantageous to arrange the weighing means according to the prior art only underneath the feed container, thus making it possible to measure the total weight without being affected by the loading construction, this makes it impossible to predict the new total weight after a new chunk of animal feed has been grabbed. By now determining the total weight of the feed container plus the loading construction, that is to say in the present case the gripper construction including the grabbed animal feed, it is then possible to determine the weight of the grabbed animal feed by determining the change in said weight. After all, it is quite possible that, in the prior art, where, as far as weight is concerned, loading is effectively carried out blindly, the total amount of animal feed in the feed container becomes too large after a new chunk of animal feed has been grabbed and released, that is to say larger than a predefined amount. However, with the present desired precision farming, accurate informaton and control with respect to the amount and in particular with respect to the composition of the dispensed feed is very important. Therefore, it is also highly desirable to have a more precise control during composition. The latter can be monitored much better with the present invention, since any new potentially too large chunk of animal feed can be returned before it ends up in the feed container. Thus, composition of the total animal feed can be effected in a better, more accurate way.

Particular embodiments of the invention are described in the dependent claims, as well as in the following detailed description.

In particular, the feed container is provided with feed-mixing means, such as one or more horizontal or vertical augers, as is customary per se with the prior-art feed-mixing wagons. Other parts, such as a feed-dispensing door or a dispensing roller may also be provided, but are known per se in the prior art, so that they do not have to be described in any more detail here.

In embodiments, the feed-mixing wagon comprises an intermediate plateau which is fitted between the frame on one side and the feed container and the gripper construction on the other side. All parts to be weighed are therefore arranged on this intermediate plateau, which can therefore readily be weighed per se, for example using means known in the prior art. Examples of the latter are two or more load cells of various sorts and sizes.

In an attractive embodiment, the gripper construction is attached to the feed container. In this case, the weighing means are preferably arranged underneath the feed container. These then weigh the weight of the feed container with the gripper construction and any grabbed animal feed. An advantage of arranging the gripper construction on the feed container is the fact that it can be more compact, as a larger part of the gripper construction is situated between the two extreme positions "on the ground" and "above the feed container". A lower total weight which can thereby be achieved is advantageous, in turn, for the weighing accuracy which is to be achieved.

Advantageously, the livestock feed wagon comprises a gripper control which is configured to control the gripper construction on the basis of the measured weight. Here, the measured weight also comprises the measured change in weight. After all, the total weight is important in order to determine whether the total feed order has been collected, but the change in weight is useful when determining the weight of the grabbed chunk of animal feed, and thus whether the desired total weight can be achieved accurately. If the latter is not the case due to the fact that the currently grabbed weight is (just a little or far) too small or too big, then the control may choose to return the present chunk of animal feed and to pick a new chunk which has been modified, and is therefore larger or smaller, respectively.

On the basis of the measured weight, it is also possible to determine if stability problems might develop. This applies in particular if the measured weight exceeds a predetermined maximum weight. The latter may be determined, for example, when the gripper is moved upwards from the pile of animal feed. The gripper does not have to be completely free in order to determine if the weight will exceed the maximum weight. In some cases, this will not even happen for the very reason that the weight is excessive. However, in any case, the control unit can control the gripper again from the point in time when it is found that the weight has been exceeded to release the grabbed animal feed, after which a new chunk can be grabbed. In this case, the maximum weight may depend on the total weight, since a larger total weight provides greater stability and thus makes a heavier chunk possible. In addition, the maximum weight may depend on the distribution of the weight in the feed container, since a centre of gravity which is situated away from the gripper construction, viewed with respect to the centre of the feed container, also makes a larger weight of the chunk possible. All this may be taken into account in the control which calculates the maximum weight based on the measured weight and, in particular cases, based on the distribution of weight. In addition, it is advantageous if the control is configured to open the gripping jaw for as long as the measured weight of the chunk of animal feed is too big. As soon as the measured weight has decreased sufficiently, either to below the maximum weight or to the desired weight to be gripped, the control closes the gripping jaw again and is to this end configured in a corresponding way. Obviously, this can be effected more readily with flowable animal feed, such as lumps, powder or maize.

It is also possible to make the weighing means of multiple design, such as by providing two, three or more load cells or the like underneath, for example, the feed container. Thus, it is also possible to determine differences in load, such as an uneven load. In order to correct this, the gripper may unload the grabbed chunk of animal feed at a desired position in the feed container. To this end, the gripper may be controlled on the basis of the measured weight, preferably of both the entirety of the gripper construction (including feed) and the feed container, and of the weight of just the chunk of animal feed, by the change in weight. The weighing means pass a weight signal on to the control which uses it to determine the weight by means of a calibration or the like, if desired supplemented by a baseline measurement.

In embodiments, the livestock feed wagon furthermore comprises an, in particular optical, 3D device for recording a spatial image containing distance information. Such a 3D device produces an image which is in itself 2-dimensional, but also contains distance information for each image point, so that a 3-dimensional representation of the observed area can be obtained, which in turn may be analysed. In this case, the term "optical" refers both to visual and infrared, such as near infrared. Examples of such 3D systems are time-of-flight cameras and structured-light cameras, such as those by PrimeSense, Ltd., known for the camera for the Kinect™. However, other systems, such as ultrasound systems, are not excluded.

The 3D device may be provided in various ways, such as on the feed container, having a fixed and well-defined position. In particular, however, the 3D device is arranged on the gripper, at least on the gripper construction. Thus, the 3D device can be directed to (only) the desired area, and can also be brought closer. This limits the required image field and the required distance, which benefits accuracy. Advantageously, the 3D device has an image field which extends into or through the area from which the gripper grabs animal feed, in which case the 3D device in particular, if the gripper comprises two gripping jaw halves, is placed in such a way that the image field extends between the open gripping jaw halves. Thus, a very efficient and dynamic image can be obtained, in which up-to-date information becomes available for the control to base itself on.

Advantageously, the 3D device is configured to determine a volume of the grabbed amount of animal feed. To this end, the 3D device may analyse, for example, the surface of the chunk of animal feed in the gripper, although sometimes a simple determination of the, optionally mean, height in the gripper may suffice. It should be noted that, in this case, analysing only has to consist of integrating or summing up the height in the image, that is to say of the surface, with a calibration with respect to the ground. Other methods of analysis are known per se from the prior art. Alternatively or additionally, it is possible to analyse just the surface of the pile of animal feed from which chunks are grabbed. From an analysis before and after grabbing a chunk of animal feed, it is also possible to determine the volume of the chunk of animal feed. However, as this concerns the original pile of animal feed, having an original density, this embodiment may be more advantageous, as it is more accurate. All this will be explained in more detail below. In addition, it is possible not to have to allow the 3D camera to look into the gripping jaw, but only to a position just in front thereof. This offers more, at least other, possibilities, such as for example for navigation or the like.

In embodiments, the livestock feed wagon comprises a memory for storing the weight of the grabbed amount of animal feed, and in particular also of the determined volume of the grabbed amount of animal feed. In other or additional embodiments, the 3D device is configured to perform an analysis of a surface of the pile of animal feed which is situated in front of the 3D device, and in which the gripper control controls the gripper construction on the basis of at least one of the analysis, the determined volume and the weight of the grabbed amount of animal feed, and the determined volume and the weight of a previously grabbed amount of animal feed. Thus, it is possible to determine the density of the feed to be grabbed more accurately. On the basis thereof, it is subsequently possible to provide a good, or at least improved, estimate of the volume which (still) has to be loaded in order to meet a total amount of animal feed to be grabbed. After all, on the basis of the information obtained thus far, the gripper construction can be controlled by the control in order to grab said volume using the gripper. To this end, it is possible, for example, for the control to determine the grabbing depth, as this has a direct correlation with the grabbed volume.

The gripper for the animal feed is not particularly limited. In embodiments, the gripper comprises two mutually pivotable gripping jaw halves. This embodiment corresponds to the gripping jaw which is well-known per se and used in many cranes and the like. In other or additional embodiments, the gripper comprises a movable blade for cutting a chunk of animal feed from a pile of animal feed, and in particular also a movable support for supporting the chunk of animal feed. Such an embodiment is in particular advantageous for relatively compact feed, such as silage. The support may, for example, comprise extending pins which are inserted into the cut-out chunk of animal feed or also a pivotable support plateau or the like which is slid underneath the chunk.

The livestock feed wagon according to the invention may, for example, be configured as a wagon which can be attached to a tractor. Advantageously, however, the livestock feed wagon comprises one or more drive means configured to drive the livestock feed wagon, in particular the frame, the feed-mixing means and/or the gripper construction, and a control for autonomously controlling one or more, and in particular all, drive means. Thus, an autonomous device is produced which can perform a task completely autonomously, such as accurate loading of an ordered amount of animal feed, of a desired composition, or for example driving the loaded animal feed to a desired location and unloading it there. The means required for this purpose, such as navigation means, or the feed-dispensing door or dispensing roller already mentioned at the start of the introduction of the description may be provided as required, but do not form the core of the present invention.

The invention will now be explained in more detail by means of the embodiments which are shown in the drawing, but are not intended to be limited and in which:

BRIEF DESCRIPTION OF THE DRAWINGS

FIG. 2 shows a diagrammatic side view of another embodiment of the livestock feed wagon according to the present invention.

DETAILED DESCRIPTION OF THE INVENTION

Figure 1:
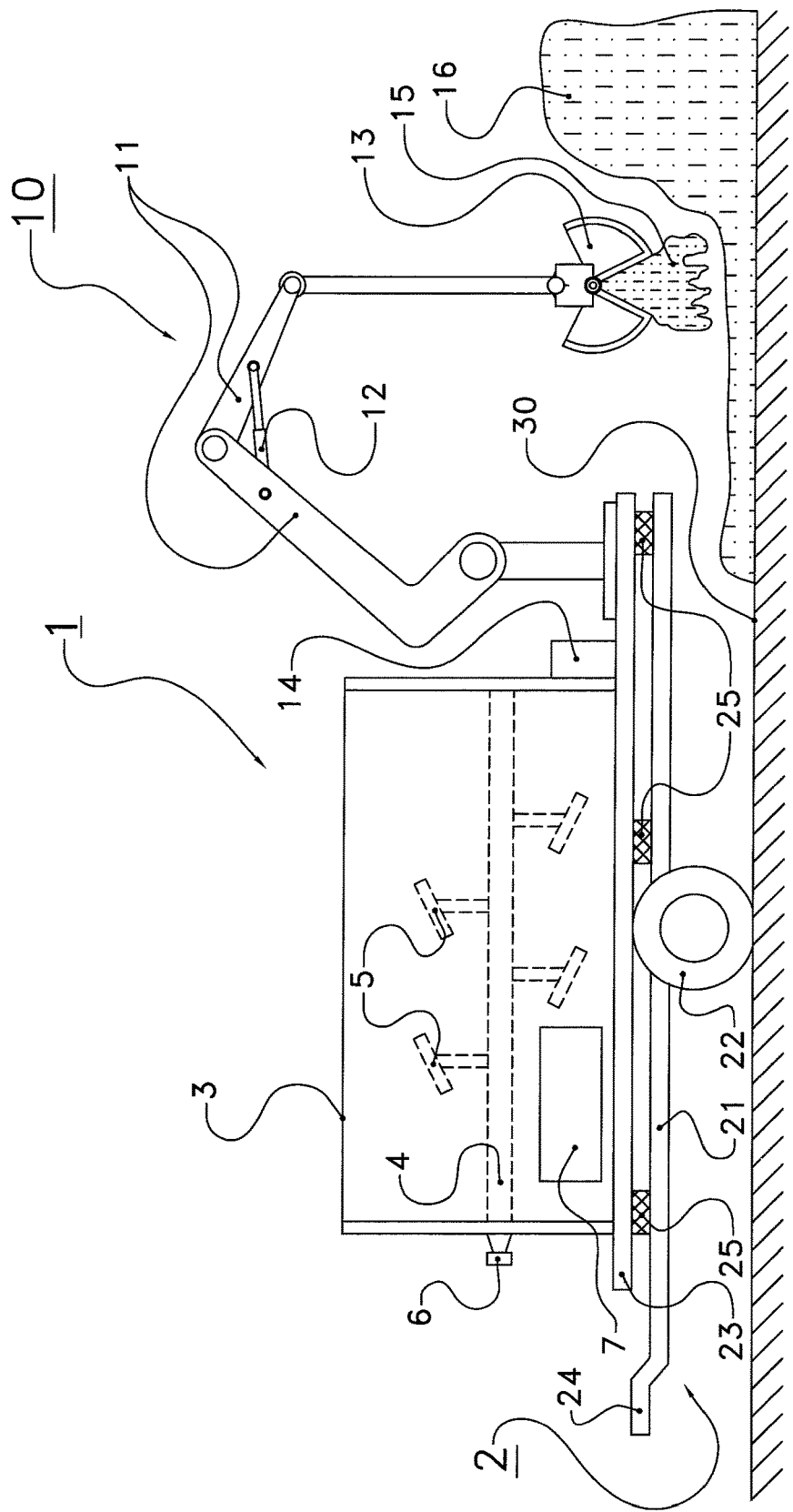
FIG. 1 shows a diagrammatic side view of a first embodiment of the livestock feed wagon according to the invention.

FIG. 1 shows a diagrammatic side view of an embodiment of the livestock feed wagon according to the present invention. This is denoted overall by reference numeral 1. The livestock feed wagon 1 comprises a frame 2 and a feed container 3. The feed container is fitted with a mixing shaft 4 with mixing plates 5, in which case a power coupling is denoted by reference numeral 6 and a dispensing door by reference numeral 7.

The frame 2 comprises a bottom panel 21, wheels 22 (only one of which is shown here) as well as an intermediate plateau 23, a tractor coupling 24 and load cells 25.

Furthermore, the livestock feed wagon comprises a gripper construction 10 with gripper arm parts 11, a pressure cylinder 12 and a gripper jaw 13 which, in this case, has taken a chunk of animal feed 15 from a pile of animal feed 16 on a floor 30.

Finally, reference numeral 14 highly diagrammatically denotes a control.

The livestock feed wagon 1 here comprises a feed container 3 with general mixing means 4, 5. Alternatives, such as a horizontal auger or a vertical auger are likewise possible. In addition, means which are known per se, such as the dispensing door 7, are indicated, but not elaborated in any more detail. The livestock feed wagon can be coupled in its entirety to, for example, a tractor unit via the tractor coupling 24 and the power coupling 6, the latter of which may for example be coupled to a power take-off.

The gripper construction 10 serves to grab chunks of animal feed 15 from piles of animal feed 16 situated on a floor 30 and to this end comprises a gripping jaw 13 which can be operated via gripper arm parts 11 and actuators, such as pressure cylinders 12. The gripper construction 10 may take the grabbed chunk of animal feed 15 above the feed container 3, for example by pivoting about a pivot (not shown). There, the chunk of animal feed 15 may be unloaded in order to then be mixed and/or cut up by means of the mixing means 4, 5. When the feed container 3 has been filled and mixed as desired, the feed wagon 1 may be taken to a desired unloading point across the floor 30, where the contents of the feed container 3 can be unloaded via the dispensing door 7.

In this embodiment, the feed container 3 and the gripper construction 10 are provided on an intermediate plateau 23. This intermediate plateau 23 is provided on the frame 21 via intermediate load cells 25. These load cells, three of which are shown here, serve to weigh the weight of anything which is situated on top. In this case, the load cells 25 thus weigh the weight of the feed container 3, the gripper construction 10 and all the animal feed which has meanwhile been grabbed. By performing a baseline measurement, the contents of the feed container 3 can be determined when gripper 13 is empty. When the gripper 13 then grabs a chunk of animal feed 15, the total weight will increase further. The change in the total weight represents the weight of the chunk of animal feed 15. The required calculations may be performed by the control 14, on the basis of weighing signals emitted by the load cells 25. The number of three load cells illustrated here is not meant to be particularly limiting, but may also be 1, 2, 4 or otherwise.

As has already been mentioned, the control 14 can process the weighing signals of the load cells 25 in order to perform a weight measurement of the contents of the feed container 3 and/or of the chunk of animal feed 15 grabbed by the gripper jaw 13. On the basis thereof, the control 14 can indicate if and, if so, how much new animal feed still has to be grabbed in order to meet a desired amount of animal feed in the feed container 3. It may be sufficient if the control 14 indicates this to an operator on a display screen or the like. It is also possible to automate the livestock feed wagon, in so far as the control 14 then controls the gripper construction 10 for grabbing one or more new chunks of animal feed 15.

FIG. 2 diagrammatically shows a side view of another embodiment of the livestock feed wagon according to the invention. In this case, similar parts are denoted by the same reference numerals.

The gripper construction comprises a 3D camera 18 with an image field 19. The livestock feed wagon 1 shown here furthermore comprises a feed pusher 26 to which an optional bumper 27 is fitted. Reference numeral 28 furthermore denotes motors.

The livestock feed wagon 1 illustrated here comprises a feed container 3 with, in this case, vertical mixing means, in particular an auger 8. Underneath the auger, a feed pusher 26 is shown which surrounds the frame (not shown) and which is configured as a frustoconical surface which can rotate. Particulars regarding this feed pusher or "skirt" can be found in patent application WO2007120036. The frame furthermore comprises a plurality of wheels 22 which, in this case, can be driven by means of motors 28, such as electric motors. These electric motors 28 and a steering device for the wheels 22 which is not designated separately can be controlled by means of the control 14. Furthermore, navigation means may be provided (not shown here) for controlling the livestock feed wagon 1. Thus, the livestock feed wagon can move completely autonomously, such as between piles of animal feed 16 and feed-unloading points, such as feeding troughs.

The bumper 27 is provided around the feed pusher 26 and serves as a safety means. When the bumper 27 is pushed in or otherwise contacted, a signal will be passed onto control 14 which will cause the livestock feed wagon 1 to stop.

In this case as well, the gripper construction, with the gripper arm parts 11, the pressure cylinders 12 and the gripper jaw 13, which can rotate about the axis of rotation 17 in their entirety, serves to grab chunks of animal feed from a pile of animal feed. However, here the gripper construction 10 is provided on the feed container 3. This means that the load cells 25 only have to be provided underneath the feed container 3. The load cells 25 now weigh the total weight of the feed container 3 including everything which is provided thereon and therein. However, it is again the case that the weight of the contents of the feed container 3 is determined from a difference measurement of the total determined weight minus a baseline measurement and with an empty gripper jaw 13. The weight of a chunk of animal feed is again determined by a difference measurement between a total weight after grabbing minus a total weight prior to grabbing. All this is again determined by the control 14 on the basis of signals of the load cells 25. Placing the gripper construction 10 on the feed container 3 has the advantage that the gripper construction can be made more compact. As a result thereof, the weight of the gripper construction 10 will also be reduced and therefore cause fewer inaccuracies during weighing.

The 3D camera 18 which is provided has an image field 19 which in this case extends through the gripper 13 in order to be able to produce an optimum image of the pile 16. However, this position is not intended to be limiting and could also be such that the image field 19 of the 3D camera 18 is just over the jaw. Nevertheless, the image with the jaw open is important for grabbing. This image of the pile of animal feed 16 can be used for analysis in order to determine where animal feed has to be grabbed. In addition, when positioned as in the figure, it is also possible to look into the gripping jaw after grabbing, so that the grabbed animal feed can be analysed, in particular with regard to its volume. In combination with the measured weight, the density of the grabbed animal feed can be determined, which may provide useful information about the location from which and the quantity (regarding volume) of animal feed which has to be grabbed for an order.

The illustrated illustrative embodiments are by no means intended to be limiting. Rather, the scope of protection of the invention is determined by the attached claims.

The invention claimed is:

1. A livestock feed wagon, comprising:
   a frame;
   a feed container which is fitted on the frame;
   a gripper construction having a movable arm construction and a gripper fitted thereon for grabbing an amount of animal feed from a pile of animal feed; and
   a weighing device,
   wherein the weighing device is arranged and configured to weigh a grabbed amount of animal feed by determining a change in the weight of at least the feed container and the gripper construction with the grabbed amount of animal feed, and
   wherein the gripper construction is attached to the feed container.

2. The livestock feed wagon according to claim 1, further comprising an intermediate plateau which is fitted between the frame on one side and the feed container and the gripper construction on the other side.

3. The livestock feed wagon according to claim 2, wherein the gripper construction is attached to the feed container.

4. The livestock feed wagon according to claim 2, further comprising a gripper control which is configured to control the gripper construction on the basis of the measured weight.

5. The livestock feed wagon according to claim 2, further comprising a 3D device for recording a spatial image containing distance information, wherein the 3D device is arranged on the gripper construction.

6. The livestock feed wagon according to claim 1, further comprising a gripper control which is configured to control the gripper construction on the basis of the measured weight.

7. The livestock feed wagon according to claim 6, further comprising a 3D device for recording a spatial image containing distance information, wherein the 3D device is arranged on the gripper construction.

8. The livestock feed wagon according to claim 1, further comprising a 3D device for recording a spatial image containing distance information, wherein the 3D device is arranged on the gripper construction.

9. The livestock feed wagon according to claim 8, wherein the 3D device is configured to determine a volume of the grabbed amount of animal feed.

10. The livestock feed wagon according to claim 9, further comprising a memory for storing the weight of the grabbed amount of animal feed, and also of the determined volume of the grabbed amount of animal feed.

11. The livestock feed wagon according to claim 8, further comprising a non-transitory computer readable storage medium for storing the weight of the grabbed amount of animal feed, and also of the determined volume of the grabbed amount of animal feed.

12. The livestock feed wagon according to claim 8, wherein the 3D device is configured to perform an analysis of a surface of the pile of animal feed which is situated in front of the 3D device, and wherein the gripper control controls the gripper construction on the basis of at least one of the analysis, the determined volume and the weight of the grabbed amount of animal feed, and the determined volume and the weight of a previously grabbed amount of animal feed.

13. The livestock feed wagon according to claim 1, wherein the gripper comprises two mutually pivotable gripping jaw halves.

14. The livestock feed wagon according to claim 1, further comprising:
   one or more drives configured to drive the livestock feed wagon, a feed mixer provided in the feed container and/or the gripper construction; and
   a control for autonomously controlling the one or more drives.

15. The livestock feed wagon according to claim 1, wherein the feed container includes a feed mixer.

16. The livestock feed wagon according to claim 15, wherein the feed mixer includes one or more horizontal or vertical augers.

17. The livestock feed wagon according to claim 1, wherein the weighing device includes a plurality of load cells.

* * * * *